US006951049B2

(12) United States Patent
Klann

(10) Patent No.: US 6,951,049 B2
(45) Date of Patent: Oct. 4, 2005

(54) EXTRACTOR, IN PARTICULAR FOR EXTRACTING CENTER PINS

(75) Inventor: Horst Klann, Villingen-Schwenningen (DE)

(73) Assignee: Klann Tools Ltd., Oxfordshire (GB)

( * ) Notice: Subject to any disclaimer, the term of this patent is extended or adjusted under 35 U.S.C. 154(b) by 0 days.

(21) Appl. No.: 10/662,704

(22) Filed: Sep. 15, 2003

(65) Prior Publication Data

US 2004/0088844 A1 May 13, 2004

(30) Foreign Application Priority Data

Sep. 16, 2002 (DE) ........................................ 202 14 361

(51) Int. Cl.[7] ................................................ B23P 19/04
(52) U.S. Cl. ........................................... 29/267; 29/263
(58) Field of Search .......................... 29/263, 264, 270, 29/267, 280, 282

(56) References Cited

U.S. PATENT DOCUMENTS 2,874,933 A 2/1959 Feucht
2,889,618 A 6/1959 Morris et al.
4,059,883 A * 11/1977 Osborne ...................... 29/259
5,727,298 A 3/1998 Strong

FOREIGN PATENT DOCUMENTS

DE 198 03 732 C2 8/1999
JP 2001277148 A 10/2001

* cited by examiner

*Primary Examiner*—Robert C. Watson
(74) *Attorney, Agent, or Firm*—McGlew and Tuttle, P.C.

(57) ABSTRACT

An extractor is provided for extracting a pin or another component which is pressed into a hole and protrudes from the hole with a cylindrical section. The extractor has a gripping element, which has a tubular basic body, is axially adjustable in a guide tube and is provided at its outer ends with at least two gripping jaws having conical outer jacket surfaces. With the gripping jaws the gripping element can be attached to the center pin or the cylindrical section. The basic body can be pulled axially into the guide tube, as a result of which the gripping jaws are pressed by conical jacket surfaces radially inwardly in cooperation with the guide tube, so that a snug hold of the gripping jaws at the cylindrical pin or the cylindrical section is brought about. Provisions are made according to the present invention that to make handling as simple as possible, the extractor has an extractor with a support tube, which can be pushed over the guide tube and is axially adjustable in relation to the guide tube via a mechanical adjusting drive, and that the support tube is supported axially indirectly or directly in the area surrounding the straight pin during the axial adjustment.

18 Claims, 9 Drawing Sheets

EXTRACTOR, IN PARTICULAR FOR EXTRACTING CENTER PINS

FIELD OF THE INVENTION

The present invention pertains to an extractor for extracting a pin or another component which is pressed into a hole and protrudes from the hole with a cylindrical section, with a gripping element, which has a tubular basic body which is axially adjustable in a guide tube and is provided at its outer end with at least two gripping jaws having conical outer jacket surfaces, with which the gripping element can be attached to the center pin or the cylindrical section, wherein the basic body can be pulled axially into the guide tube, as a result of which the gripping jaws are pressed by their conical jacket surfaces radially inwardly with the guide tube, so that a snug hold of the gripping jaws at the straight pin or the cylindrical section is brought about.

BACKGROUND OF THE INVENTION

Center pins are used, e.g., to accurately align two components to be connected to one another in a flange-like manner. For example, gear casings are placed in an accurately aligned manner on an engine block of a motor vehicle engine via center pins and are fastened to the engine block by means of bolts. The center pins are regularly pressed into corresponding mounting holes of, e.g., the engine block. To make it possible to replace the center pins, these must be removed from the press fit and pulled out of their mounting holes. Special tongs, which are provided with corresponding gripping elements and by means of which extremely strong clamping forces can be applied for gripping a straight pin, are conventionally used for this purpose. Since the straight pins are seated extremely firmly in their mounting holes, blows are applied to the tongs with a hammer in the direction of extraction, so that the corresponding straight pin is released from the mounting hole and extracted millimeter by millimeter. If such tongs are provided with a self-locking mechanism, tire levers are usually used to release and extract the straight pin, and these tire levers are supported on the engine block during the extraction operation and grip behind the gripping elements of the tongs. However, damage to the surface of, e.g., the engine block around the area surrounding the mounting hole must always be expected to occur in the process, so that this method cannot be recommended.

Furthermore, such straight pins are also provided for the accurate mounting of flywheels on the front side of a crankshaft, which also must be released and extracted when needed. Another problem with the extraction of such straight pins is their accessibility. It is extremely difficult to strike the gripping elements of the tongs with a hammer in the installed state. This also applies to the lever method.

The removal of hardened straight pins from the fitting holes of aluminum engine blocks is especially problematic. Since the straight pins are seated in very deep fitting holes in these cases, the extraction of such straight pins is not possible with the methods described at all. This is also due, in particular, to the fact that these hardened straight pins are harder than the gripping jaws of the tongs used, so that these tongs with their gripping jaws always slip off from the straight pins and the aluminum engine blocks cannot therefore be used anymore, because the straight pins cannot be removed and replaced with new ones.

Furthermore, there also are other components which are pressed into a corresponding mounting hole in the normal operating state and must be replaced when needed. Such components include, e.g., injection nozzles, which are arranged integrated in the motor housing in the area of the crankshaft of the engine. Such injection nozzles are used, e.g., to lubricate and cool the pistons of the engine. These injection nozzles also must be extracted from their mounting holes in case of damage, which is associated with the additional problem that these injection nozzles are arranged recessed in the inner area of the engine block and access to them is very difficult. These injection nozzles usually have a cylindrical section, with which they axially protrude from their mounting holes and can thus be gripped with tongs or a similar tool. The injection nozzle is usually provided in the area of this cylindrical section with a nozzle tube, which initially extends radially and is then bent toward the piston, so that this makes the access additionally difficult.

Another disadvantage of the hitherto known processes and methods for extracting straight pins is that the holding forces of the gripping element are often insufficient to perform the extraction in one operation. It is therefore often necessary to change the grip on the straight pin with the gripping element, because the gripping element slips off the straight pin, especially if it is struck with a hammer. This happens especially in the case of hardened straight pins installed in an aluminum housing, as was already described above in connection with aluminum engine blocks.

For example, a device with which drive shafts mounted recessed in a depression of a housing can be extracted is known from, e.g., U.S. Pat. No. 5,727,298 for making it possible to apply stronger holding forces. A tubular basic body is provided here, which is provided at one of its ends with gripping elements, which have an outer jacket surface widened conically radially toward the end. This basic body is received with its gripping elements in the mounting hole of a guide tube in an axially adjustable manner. The mounting hole has a conical inner surface in the axial end area of the gripping elements, so that when the basic body with its gripping elements is pulled into the hole with its conical section, the gripping elements are pressed radially inwardly with their conical section. If the gripping elements, which define a cylindrical hole between them, are seated on the drive shaft, the radial adjustment of the gripping elements brings about a clamping force between the gripping elements and the drive shaft. To make it possible to pull the basic body with its gripping elements into the hole of the guide tube, the basic body is provided with a threaded section at its end located opposite the gripping elements. This threaded section protrudes from the guide tube, so that a tensioning nut can be screwed on. When the tensioning nut is tightened, the basic body is pulled with a strong force into the guide tube. Once this tool is seated firmly on the drive shaft, the drive shaft can be extracted. A plurality of pressing screws screwed into a radially outwardly protruding flange of the guide tube are provided for this purpose. The flange is arranged in the area of the threaded section of the basic body, so that the guide tube protrudes into the depression of the housing. The pressing screws are supported for the extraction at the edge of the area surrounding the depression. When these pressing screws are tightened, the guide tube is extracted from the depression together with the basic body and its gripping elements, so that the drive shaft is also inevitably removed from its hole. Only very specific drive shafts arranged in a depression can be extracted with this prior-art device. Furthermore, both the device and the housing or the depression in the housing may be damaged if the pressing screws are not tightened uniformly. If, e.g., only one of the pressing screws is tightened very tightly at the beginning of the extraction operation, this leads to damage to the surface of the housing and also to damage to the drive shaft, because the pulling force acts obliquely in relation to the direction of the axis of the drive shaft. Furthermore, the extraction is very time-consuming, because the pressing screws can always by tightened by a minimum amount one after another in order to prevent such damage. This means that even though this device could apply the necessary clamping forces for gripping a drive shaft, the handling of the device is extremely time-consuming and complicated.

SUMMARY OF THE INVENTION

Thus, the basic object of the present invention is to provide an extractor with which soft and hardened straight pins or similar components, which axially protrude from their mounting holes with a cylindrical section, can be reliably extracted in a simple manner.

This object is accomplished according to the present invention by providing an extractor with a support tube, which can be pushed over the guide tube and is axially adjustable in relation to the guide tube by means of a mechanical adjusting drive and by the support tube being axially supported indirectly or directly in the area surrounding the straight pin during the axial adjustment.

The embodiment according to the present invention makes available an extractor which can be brought into a fixing engagement with a straight pin or a similar component to be extracted from a mounting hole in a simple manner. Extremely simple handling of the extractor is guaranteed by the straight pin provided, because the support tube can be operated with the adjusting drive in a simple manner. Because of the indirect or direct, uniform support in the area surrounding the component to be extracted, the pulling forces act absolutely in the direction of the axis of this component or hole, into which the component is pressed, so that no damage can occur whatsoever.

The extractor may be formed from a mechanical drive, which is supported via a corresponding supporting device on the component into which the straight pin or the component to be extracted is pressed.

Provisions are made according to the present invention for the extractor to be formed from a support tube, which can be pushed over the guide tube and is axially adjustable in relation to the guide tube by means of a mechanical adjusting drive, and for the support tube being supported axially indirectly or directly in the area surrounding the straight pin during the axial adjustment. Due to the extractor being designed as a support tube and able to be pushed over the guide tube, the extractor forms a structural unit with the extractor, so that the handling of the extractor is considerably facilitated.

Provisions may be made for the mechanical adjusting drive to be formed from at least one eccentric lever, which is provided with a cam plate, can be actuated manually and is mounted pivotably at the support tube, and for the cam plate being axially supported at a radially protruding support flange of the guide tube during the pivoting movement of the eccentric lever. The handling is extremely simplified by this embodiment as well, and extremely strong pulling forces can be applied with weak actuating forces due to the cam plate in cooperation with the radially protruding support flange of the guide tube. Furthermore, the guide tube is axially retracted together with the gripping element in the support tube during the actuation of the cam plate of the guide tube, so that the extraction movement for extracting the straight pin is also brought about hereby.

Provisions may be made for the length of the support tube to be adapted to the length of the guide tube for the direct support in the area surrounding the straight pin such that the support tube ends approximately flush with the guide tube in its axial starting position when the adjusting drive is not actuated. The extractor according to the present invention can be used due to this design in a simple manner in the case of straight pins that are accessible in a simple manner and are seated in an essentially flat base.

Adapters that can be pushed axially over the support tube may be provided for indirectly supporting the support tube in the area surrounding the straight pin. The extractor according to the present invention can be adapted due to this design especially to different surface shapes in the area surrounding the straight pin to be extracted. For example, components are known in which the pressed-in straight pin is surrounded by a circular, axially protruding ring web. For example, annular adapters, which can be placed over this ring web, may be provided in such a case, so that an enlarged, flat contact surface is obtained for the support tube around the straight pin.

Provisions may be made for the length of the support tube to be made substantially shorter than the guide tube and for a support frame to be provided as the adapter with a support ring, through which the guide tube passes axially during use toward the component to be extracted, and for the pulling device to be supported axially at the component into which the component is inserted. Such an embodiment is advantageous, e.g., when the component to be extracted is recessed. This is the case of, e.g., injection nozzles of motor vehicle engines, which are arranged recessed in the area of the crankshaft within the engine housing. It may be necessary in such a case for the support device to be supported, e.g., at the web surface of the engine housing, to which the oil pan of the motor vehicle engine is normally fastened. The support frame is arranged here on this web surface, and the extractor with the support ring pushed over the guide tube up to the support tube is inserted into the support frame. The guide tube passes through the support ring in the axial direction toward the injection nozzle. The length of the support tube and of the support ring are adapted such that the gripping element with its gripping jaws can be placed on the cylindrical part of the injection nozzle, which said cylindrical part protrudes from the inner surface of the engine housing.

One or more intermediate rings of equal or different axial length, by means of which the length of the guide tube passing through the support ring can be set to different amounts, may also be provided in this connection. Due to the intermediate rings provided, the device according to the present invention can be adapted, e.g., to the extraction of injection nozzles seated at different depths in the engine housing.

Provisions may be made for the support tube to be provided at its end located toward the guide tube with a bearing flange, in which the eccentric lever or eccentric levers is/are mounted pivotably, and for one or more tension springs, by which the guide tube is reset into its starting position during the relief of the eccentric lever in the support tube, being provided between the support flange of the guide tube and the bearing flange of the support tube. The extractor is always reset automatically into its starting position by this embodiment after the extraction of a straight pin or a similar component.

Provisions are made for providing a pulling spindle for pulling the basic body into the guide tube, the said pulling spindle being provided at one of its ends with an external thread, with which the pulling spindle engages an internal thread of the basic body for the axial adjustment of the basic body in the guide tube, and for the threaded spindle to be mounted in an axially firmly seated manner and rotatably in the guide tube in a head part of the guide tube, which is located axially opposite the basic body. Due to the fact that the pulling spindle is held in an axially firmly seated manner in the guide tube, the clamping connection of the gripping jaws with the component to be extracted can be separated again in a simple manner. To do so, the pulling spindle must only be rotated in the opposite direction in relation to the tensioning, so that the basic body with its gripping jaws is pressed axially out of the guide tube. The gripping jaws now inevitably move again radially outwardly because of their conical jacket surface, so that the component to be extracted is released. Thus, the handling is considerably simplified by this design. In the subject of U.S. Pat. No. 5,727,298, the basic body must be "beaten" out of the guide tube by blows with a hammer in order to release the drive shaft. This is not proper, because, e.g., the thread on which the tensioning nut is seated is damaged hereby. Furthermore, the threaded connection between the pulling spindle and the gripping element is arranged in the subject of the present invention within the guide tube, so that it is protected from damage.

The handling of the extractor according to the present invention is additionally simplified considerably. Thus, provisions are made for the pulling spindle to have a wrench profile protruding axially from the guide tube at its end located opposite the gripping element, and for a knurled head to be able to be optionally fastened in the axial extension of this wrench profile. On the one hand, high drive torques can be applied to the pulling spindle via the wrench profile by means of a suitable wrench, so that strong pulling forces can correspondingly also be transmitted to the gripping element. On the other hand, the pulling spindle can be first pretensioned with the fingers by means of the knurled head after the extractor has been attached to, e.g., a straight pin, so that the extractor is at first held clampingly at the straight pin at least to the extent that the wrench can subsequently be attached to the wrench profile of the pulling spindle in a simple manner without the extractor being able to slip accidentally off the straight pin.

To drive the pulling spindle, provisions may be made for this purpose for a ratchet, which can be reversed for rotation to the right and for rotation to the left, and which is captively secured on the wrench by the knurled head, to be attached to the wrench profile. By fixing the ratchet on the pulling spindle by means of the knurled head, the extractor forms a unit which is able to function, so that it is not necessary to keep additionally ready a suitable tool all the time.

Provisions may be made for providing different gripping elements with gripping jaws of different designs, which can be arranged interchangeably with one another in the guide tube, and for the different gripping jaws to be provided with radially inwardly directed clamping surfaces, which form, in their nontensioned starting position, an approximately circular hollow cylinder each, which is interrupted in the circumferential direction and has different diameters. Due to these interchangeable gripping elements with their clamping surfaces designed differently in terms of their "mounting diameters," the extractor according to the present invention can be adapted in a simple manner to different diameters of straight pins or similar components to be extracted. The different gripping elements can be replaced in a very short time by simply screwing them off and on the pulling spindle.

The clamping surfaces of the gripping jaws may have different surface structures and optionally provided with internal teeth or a hard metal surface coating. In particular, provisions are made here for the gripping jaws with internal teeth to be used to extract straight pins with a soft, non-hardened surface, whereas gripping jaws with a hard metal surface coating are also used for hardened straight pins. Optimal adhesion of the straight pins received clampingly in the gripping jaws is always guaranteed by these different designs depending on the conditions of use.

The gripping jaws may be provided with axial extension sections, which protrude over the guide tube by several mm, and a larger recess is provided in the area of at least one of the longitudinal slots separating the gripping jaws together with the extension section. Due to this design, the gripping jaws with their extension sections can also grip components such as an injection nozzle of a motor vehicle engine, which is provided with a radially protruding nozzle tube, in a simple manner. When the extractor is attached, the recess is fittingly aligned with the nozzle tube of the injection nozzle, and the gripping jaws with their axially protruding extension sections are pushed over the injection nozzle to be extracted.

The present invention will be explained in greater detail below on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
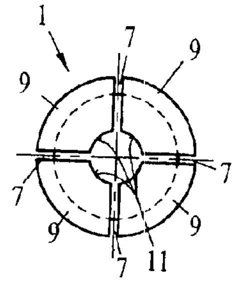
FIG. 2 is a front view II of the gripping element from FIG. 1.
Figure 1:
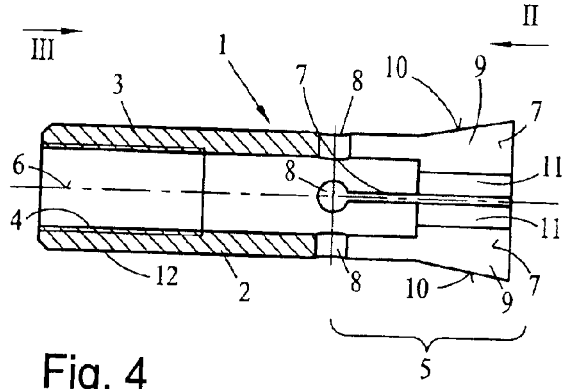
FIG. 1 is a longitudinal section through a first exemplary embodiment of a gripping element according to the present invention.
Figure 3:
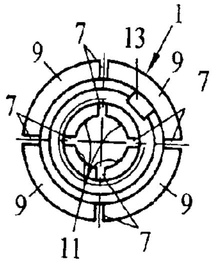
FIG. 3 is a second front view III of the gripping element from FIG. 1.
Figure 4:
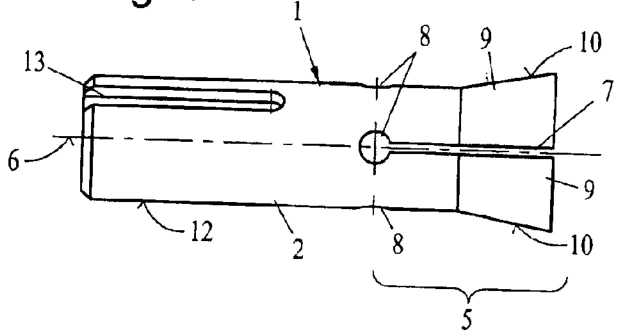
FIG. 4 is a side view of the gripping element from FIG. 1.

Referring to the drawings in particular, FIGS. 1 through 4 show a first exemplary embodiment of a gripping element 1, which has a tubular, approximately hollow cylindrical basic body 2. In one end area 3 the basic body 2 is provided with an internal thread 4, into which a pulling spindle 40, to be described in greater detail in connection with FIG. 11, can be screwed. In its end area 5 located opposite this internal thread 4, the basic body 2 is provided with four longitudinal slots 7, which extend in parallel to its central longitudinal axis 6, are arranged crosswise and open into a radial hole 8 each of the basic body 2. Due to these longitudinal slots 7 the basic body 2 forms four gripping jaws 9 in its end area that is the right-hand end area in FIGS. 1 and 4, and the said gripping jaws 9 are elastically adjustable in the radial direction in relation to the central longitudinal axis 6 of the basic body 2. A nonloaded starting position of the gripping jaws 9, in which the gripping jaws are not pretensioned radially, is shown in FIGS. 1 and 4.

Figure 10:
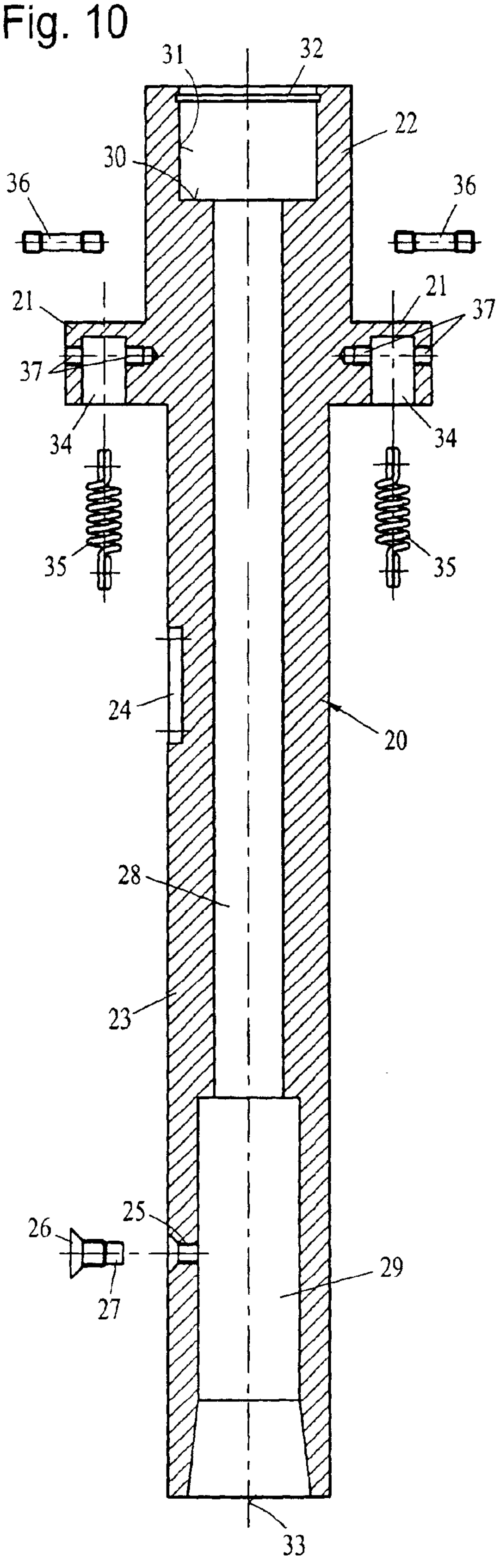
FIG. 10 is a vertical section X—X through the guide tube from FIG. 9.

In their axially outer end area, the gripping jaws 9 are provided with an outer jacket surface 10 each, which becomes larger radially conically toward the right-hand end and by which a radial adjustment of the gripping jaws 9 is brought about if the gripping element 1 is pulled into a guide tube 20, as is shown as an example in FIG. 10. In the area of this jacket surface 10 the gripping jaws 9 form an inner clamping surface 11 each, which are provided for gripping, e.g., a straight pin or a component of a similar shape.

These clamping surfaces 11 form together an approximately round hollow cylinder, which is interrupted in the circumferential direction and whose diameter is adapted to the diameter of a straight pin to be gripped or of a corresponding component to be extracted from a mounting hole.

Furthermore, the basic body 2 is provided on its cylindrical jacket surface 12 joining the gripping jaws 9 toward the internal thread with a guide groove 13, which is open axially opposite the gripping jaws 9 and by which the gripping element 1 is guided in a guide tube axially displaceably and nonrotatably.

Figure 5:
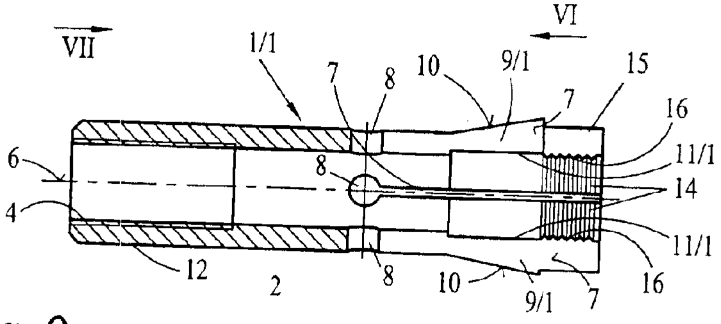
FIG. 5 is a longitudinal section through a second embodiment of a gripping element according to the present invention.
Figure 7:
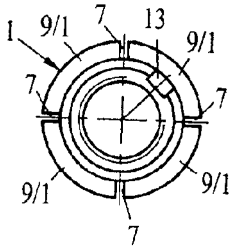
FIG. 7 is a second front view VII of the gripping element from FIG. 5.

Furthermore, provisions are made for the clamping surfaces 11 to be provided with profiled surface, e.g., with internal teeth 16, as is shown for the gripping element 1/1 from FIG. 5, depending on the properties of a straight pin to be extracted. This profile may be designed as a kind of teeth, a defined surface roughness or the like. Such a profiled surface may be needed, e.g., to extract soft, nonhardened straight pins in order to reach a stronger adhesion between the gripping jaws and the straight pin. Provisions are made, furthermore, especially for extracting hardened straight pins, for these clamping surfaces 11 to be provided with a hard metal surface coating.

FIGS. 5 through 8 show a second exemplary embodiment of a gripping element 1/1. This gripping element 1/1 has essentially the same design as the gripping element 1 from FIGS. 1 through 4. The same reference numbers are correspondingly also used in FIGS. 5 through 8 for the same components of this gripping element 1/1, so that the above description should also be read in this respect for this gripping element 1/1.

Only the gripping jaws 9/1 have a somewhat different design in this second exemplary embodiment. Thus, the gripping jaws 9/1 have, besides the internal teeth 16 provided, axial extension sections 14 on the outside, which protrude in the nonmounted state essentially over their axial length from a guide tube 20 (FIG. 9) into which the gripping element 1/1 is inserted in the operating state. The clamping surfaces 11/1 are correspondingly also extended outwardly.

Figure 6:
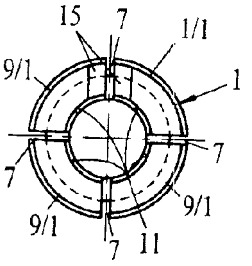
FIG. 6 is a front view IV of the second gripping element from FIG. 5.
Figure 8:
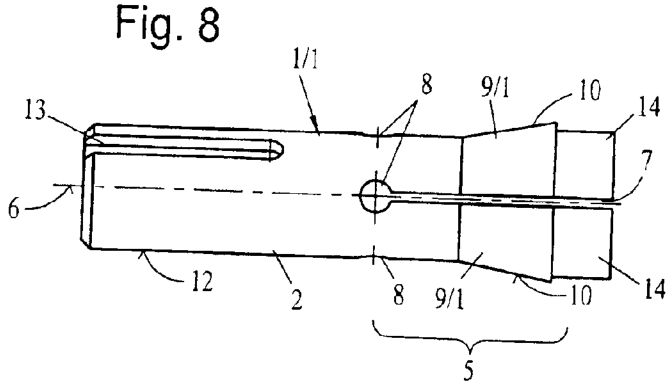
FIG. 8 is a side view of the gripping element from FIG. 5.

As is also apparent from FIG. 5, these clamping surfaces 11/1 likewise form a hollow cylinder, which has, however, a larger diameter than the hollow cylinder that is formed by the clamping surfaces 11 of the gripping element 1 from FIGS. 1 through 4. The gripping element 1/1 is correspondingly also used to receive or extract components with a correspondingly larger diameter. Furthermore, an enlarged recess 15, which protrudes into the adjacent extension sections 14 in the circumferential direction and extends axially over the entire axial length of the extension sections 14, is provided in the area of one longitudinal slot 7 (FIGS. 5 and 6). With the gripping element 1/1 aligned correspondingly, this recess 15 is used to receive, e.g., a nozzle tube 105 of an injection nozzle 106, as will be described as an example below in connection with FIGS. 28 and 28*a*.

Figure 9:
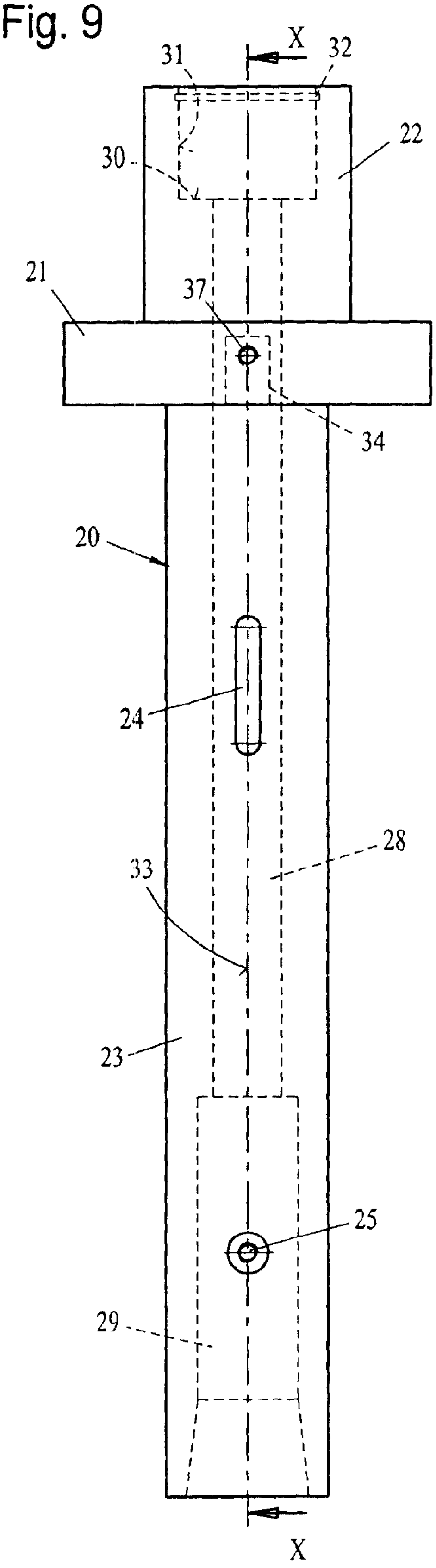
FIG. 9 is a side view of a guide tube.
Figure 11:
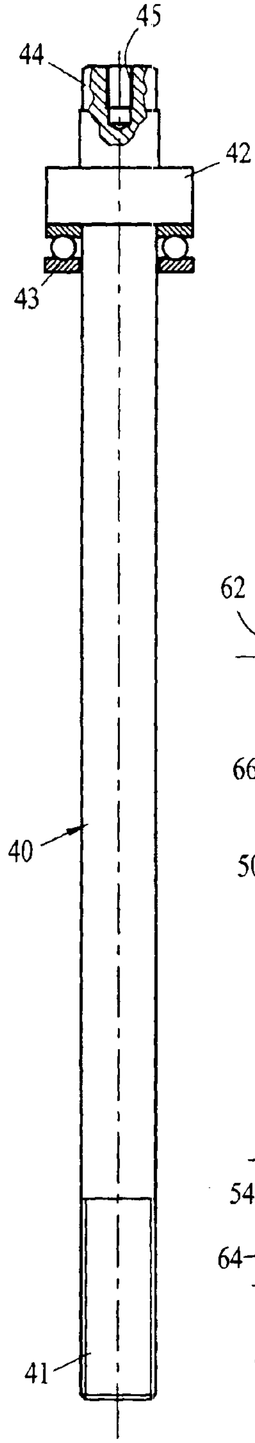
FIG. 11 is a side view of a pulling spindle.

FIGS. 9 and 10 show a guide tube 20, which has a support flange 21 in its upper end area. Above this support flange 21, the guide tube 20 forms a cylindrical head part 22, which is used to axially support a pulling spindle 40 during the operation, as is shown in FIG. 11. Below the support flange 21, the guide tube forms a cylindrical guide section 23, onto which a support tube 50 can be screwed in an axially adjustable manner. Such a support tube 50 is shown as an example in FIG. 13.

Furthermore, the guide section 23 is provided with an axially limited guide groove 24, which is used to secure the support tube 50 against rotation and to limit the axial path of adjustment of this support tube in the operating state.

Furthermore, the guide section 23 has a radial internal thread 25, into which a locking screw 26 can be screwed radially from the outside, in its lower end area. At its free end this locking screw 26 has a guide pin 27, with which the locking screw engages the guide groove 13 of the gripping element 1 or 1/1 in the mounted state.

Furthermore, the guide tube 20 has a central, stepped through hole 28, which forms a radially expanded mounting section 29 in its lower end area. One of the gripping elements 1 or 1/1 can be optionally pushed into this radially expanded mounting section 29 in an axially adjustable manner. As is also apparent from FIG. 10, the mounting section expands conically to the outside in the radial direction at its lower, outer end. Due to this conical shape in the axially outer end area of the mounting section 29, the gripping jaws 9 and 9/1 of the gripping element 1 and 1/1 are tensioned radially inwardly as soon as the gripping element 1 and 1/1 is pulled with the radially outermost end edge of the conical jacket surface 10 of its gripping jaws 9 and 9/1 into this conical end area of the mounting section 29.

The through hole 28 is likewise expanded radially in its upper end area and forms a cylindrical, radially expanded mounting section 31 with a circular seating 30, on which the pulling spindle 40 from FIG. 11 is supported axially in the mounted state. A circular securing groove 32, into which a circlip 87 (FIG. 21) can be inserted to captively receive the pulling spindle from FIG. 11, is provided in the upper end area of the mounting section 31.

Furthermore, it can be recognized from FIG. 10 that the support flange 21 is provided with two blind holes 34, which extend in parallel to the central longitudinal axis 33 of the guide tube 20 and which are located diametrically opposite each other. Two tension springs 35, which can be fixed by two mounting pins 36 in the respective blind hole 34, can be inserted into these blind holes 34. Threaded holes 37, which extend correspondingly at right angles radially from the outside to the inside and pass through the respective corresponding blind hole 34 and into which the mounting pins 36 can be screwed completely, are provided for this purpose in the upper end area of the blind holes 34.

FIG. 11 shows the above-mentioned pulling spindle 40, which is provided with an external thread 41 at its lower end. The pulling spindle 40 is detachably in connection with the internal thread 4 of one of the gripping elements 1 or 1/1 during the operation, so that when the pulling spindle 40 is actuated, one of these gripping elements 1 or 1/1 can be pulled with its gripping jaws 9 and 9/1 axially into the guide tube 20. At its end located opposite the external thread 41, the pulling spindle 40 has a radially protruding support flange 42, via which the threaded spindle is axially supported at a thrust bearing 43, which is likewise shown in FIG. 11. This pulling spindle 40 is in the upper mounting section 31 of the central through hole 28 of the guide tube 20 in the mounted state and is supported axially at the seating 30 of the mounting section 31 via the thrust bearing 34.

Above the support flange 42 the pulling spindle 40 is provided with a drive hexagon 44, so that the pulling spindle 40 can be driven rotatingly by means of a suitable wrench.

Figure 12:
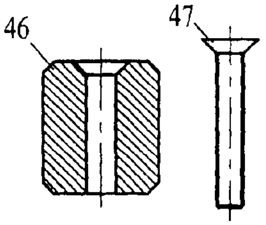
FIG. 12 is a section through a knurled head that can be mounted on the pulling spindle from FIG. 12 together with a mounting screw.

Furthermore, the pulling spindle 40 has an internal thread 45 in the area of the drive hexagon 44, and a knurled head 46 shown in FIG. 12 can be fastened, rotating in unison, by means of the said internal thread 45. A corresponding mounting screw 47, which is likewise shown in FIG. 12, is provided for mounting the knurled head 46 from FIG. 12 at the top end of the pulling spindle 40. This knurled head 46 is used to actuate the pulling spindle 40 manually, so that the pulling spindle 40 and consequently the particular gripping element 1 or 1/1 inserted into the guide tube 20 can be pretensioned manually before the use of a wrench.

Figure 13:
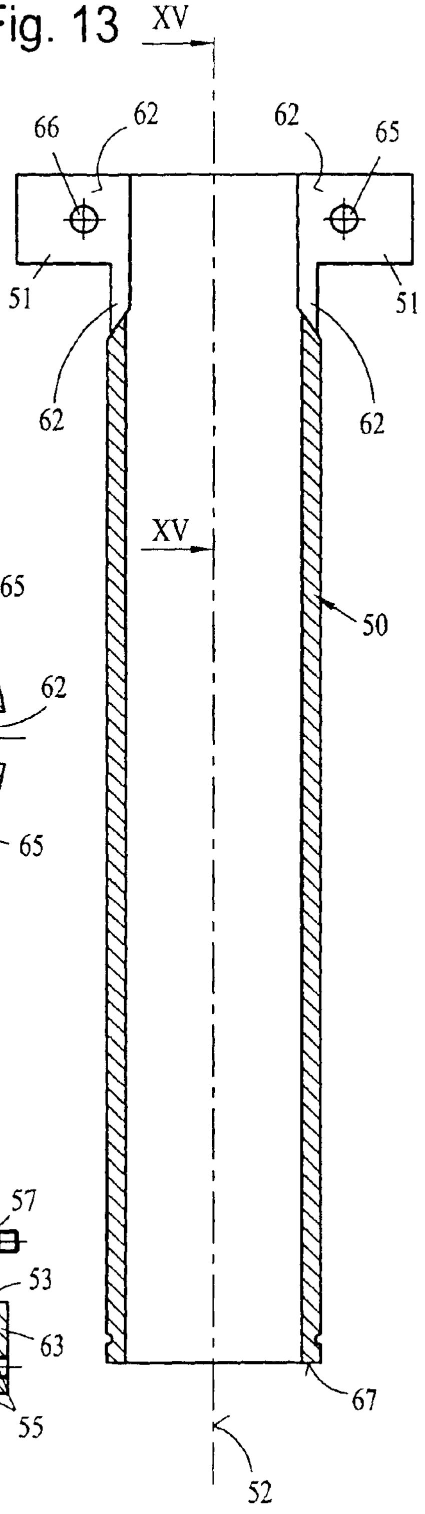
FIG. 13 is a vertical section through a support tube.

FIG. 13 shows the support tube 50, which was likewise mentioned above, and which is provided with an interrupted, radially protruding bearing flange 51 at its upper end. As is apparent from FIGS. 14 and 15, this bearing flange is provided with two diametrically opposed through holes 53 and 54 extending in parallel to the central longitudinal axis 52 of the support tube 50.

These through holes 53, 54 are provided in their lower end area with through threads 55 and 56, which extend at right angles, radially to the central longitudinal axis 52, and into which a respective mounting pin 57 and 58 each can be screwed. These two mounting pins 57 and 58 are used, corresponding to the mounting pin 36 of the guide tube 20, to fix the lower eye rings of the two tension springs 35 in the mounted state.

Figure 15:
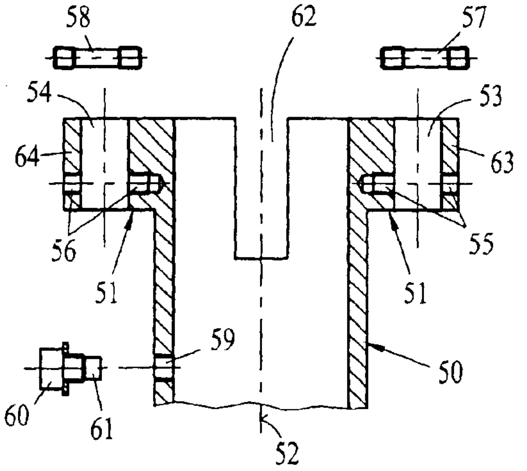
FIG. 15 is a partial section XV—XV of the support tube from FIGS. 13 and 14.

Furthermore, as is apparent from FIG. 15, a threaded hole 59, into which a hexagon socket screw 60 can be screwed, is provided in the wall of the support tube 50. This hexagon socket screw 60 has a guide pin 61, which engages the guide groove 24 of the guide tube 20 in a positive-locking manner in the state in which the support tube 50 is mounted on the guide tube 20, so that the support tube 50 is guided on the guide tube 20 in such a way that it can be displaced axially by a limited amount and nonrotatably.

Figure 14:
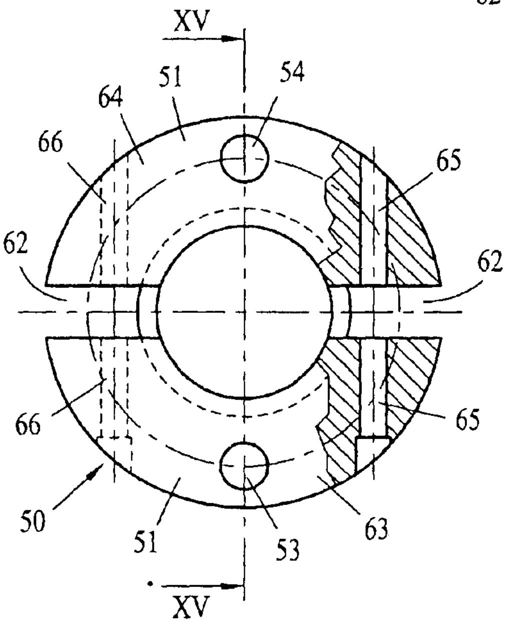
FIG. 14 is a top view of the support tube from FIG. 13.

Furthermore, it can be recognized from FIGS. 13 and 14 that in the area of its bearing flange 51, the support tube 50 has a cross slot 62, which extends in parallel to the central longitudinal axis 52 and by which the bearing flange 51 is divided into two flange halves 63 and 64. In the area of this cross slot 62, the bearing flange 51 has a cross hole 65 and 66 each, which pass through the cross hole 62 and pass completely through the two flange halves 63 and 64.

Figure 16:
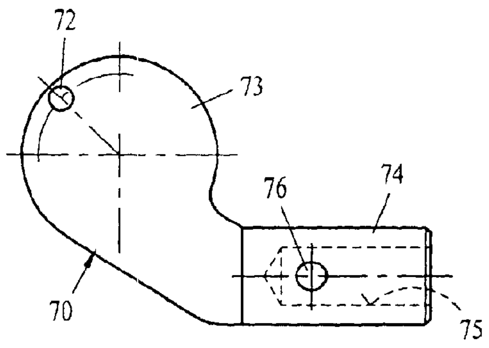
FIG. 16 is a side view of an eccentric lever.
Figure 17:
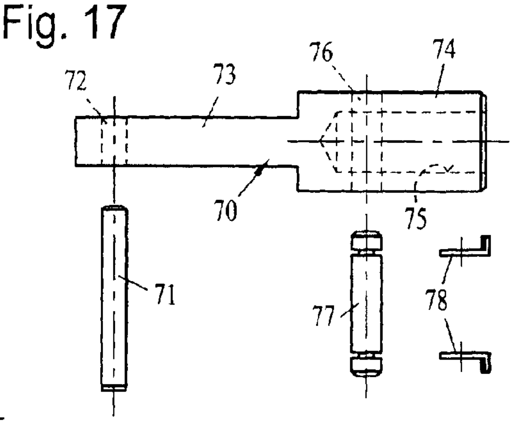
FIG. 17 is a top view of the eccentric lever from FIG. 16.

Two eccentric levers 70 (FIGS. 16 and 17) can be inserted into this cross slot 62 on both sides, the said eccentric lever 70 being mounted pivotably in the respective cross slot 62 via a pivot pin 71. One of these pivot pins (FIG. 17) can be pushed in a firmly seated manner into the respective cross hole 65 and 66 for this purpose. For the pivotable mounting of the eccentric lever 70 (FIG. 16), this eccentric lever has a corresponding bearing hole 72. As is apparent from FIG. 16, the eccentric lever 70 has a cam plate 73 arranged eccentrically to the bearing hole 72.

Furthermore, a bearing block 74, which is provided with a plug hole 75, is made in one piece with the cam plate 73. Furthermore, a through hole 76, which passes through the plug hole 75 and through which a mounting pin 77 can be passed, is provided in the inner end area of the plug hole 75 located toward the cam plate. The said mounting pin 77 passes through the through hole 76 in the mounted state on both sides and is secured in this functional position by two lock washers 78.

Figure 18:
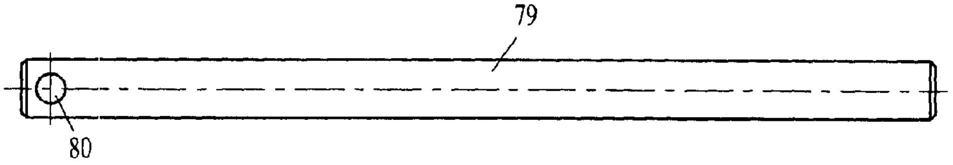
FIG. 18 is a handle for the eccentric lever from FIG. 16.

The plug hole 75 of the bearing block 74 is used to removably receive a handle 79 (FIG. 18), which can be inserted fittingly into the plug hole 75. To secure its position in the plug hole 75, the handle 79 has a corresponding cross hole 80 in its end area, and the mounting pin 77 passes through the said cross hole 80 in the mounted state.

Figure 19:
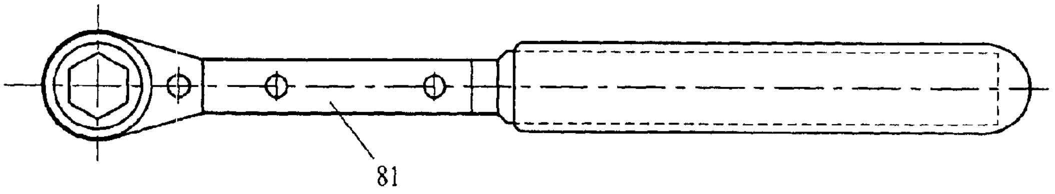
FIG. 19 is a top view of a ratchet that can be reversed for rotation to the right and for rotation to the left.
Figure 20:
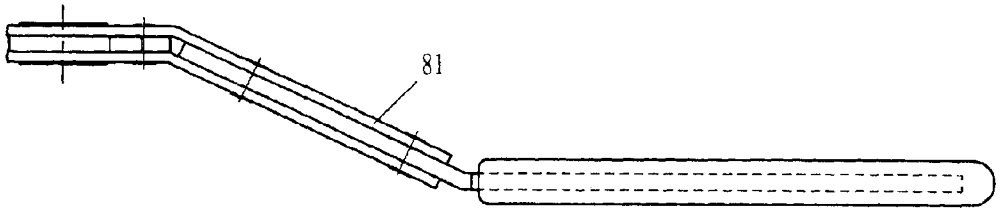
FIG. 20 is a side view of the ratchet from FIG. 19.

FIGS. 19 and 20 show a reversible ratchet 81, which is bent twice, as can be seen especially in FIG. 20. This ratchet 81 is used to drive the pulling spindle 40 shown in FIG. 11, as will be explained in greater detail below.

FIGS. 21 through 24 show different views of an extractor 85 comprising the above-described components, which is attached to a straight pin 86 to be extracted.

Figure 21:
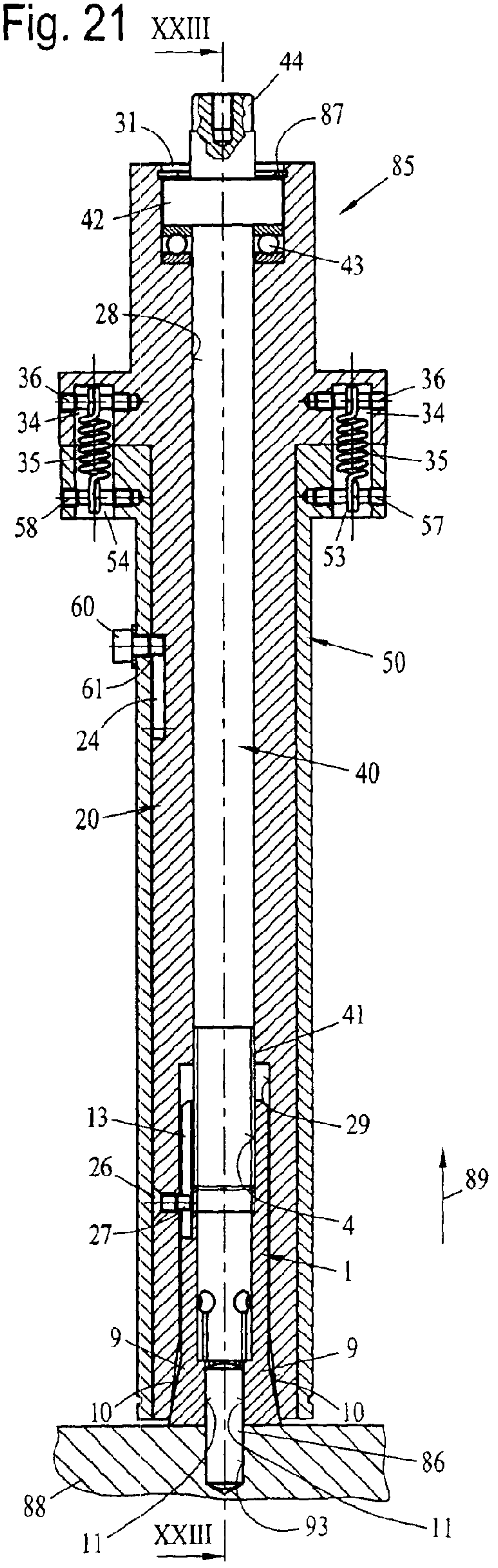
FIG. 21 is a longitudinal section through a completely mounted extractor, which is attached to a pressed-in straight pin.

Thus, FIG. 21 shows the completely assembled state of the extractor 85. The gripping element 1 is inserted in this embodiment into the mounting section 29 of the guide tube 20 from below. It can be recognized that the gripping element 1 with its gripping jaws 9 is located in the lower, conical area of this mounting section 89 and is supported radially at the inner wall, in the area of the lower end edge of this conical area. The gripping jaws 9 protrude over the lower end of the guide tube 20 by 1 mm to several mm, so that when the gripping element 1 is pulled farther into the mounting section 29 of the guide tube 20, the gripping jaws 9 are adjusted radially inwardly via their outer, conical jacket surfaces 10.

Furthermore, the pulling spindle 40 is inserted from the top into the through hole 28 of the guide tube 20 and engages with its lower external thread 41 the internal thread 4 of the gripping element 1. As can also be recognized from FIG. 21, the support flange 42 is completely accommodated together with the thrust bearing 43 in the mounting section 31 of the head part 22 of the guide tube 20. The support flange 42 is located with its top side under the securing groove 32 shown in FIG. 10, into which a corresponding circlip 87 is inserted in FIG. 21 for captively holding the entire pulling spindle 40.

As can also be recognized from FIG. 21, the pulling spindle 40 protrudes over the head part 22 of the guide tube 20 in the vertical direction with its drive hexagon 44, so that the latter is freely accessible from the outside.

In the completely mounted state shown, the support tube 50 is pushed over the guide tube 20 from below and is in contact with its bearing flange 51 with the underside of the support flange 22 of the guide tube 20 in the passive starting position shown in FIG. 21. The two blind holes 34 of the support flange 21 extend coaxially with the through holes 53 and 54 of the bearing flange 51 located under it in this mounted position. The two tension springs 35 are provided to hold the support tube 50 in this starting position. These tension springs 35 are held in the blind holes 34 by the two mounting pins 36, which are correspondingly screwed completely into the threaded holes 37 shown in FIG. 10.

Furthermore, the two mounting pins 57 and 58 are also screwed into the corresponding through threads 55 and 56 belonging to them (FIG. 15), so that the support tube 50 is held in the axial starting position on the guide tube 20 by the two tension springs 35. To prevent the support tube 50 from rotating in relation to the guide tube 20, the hexagon socket screw 60 engages with its guide pin 61 the guide groove 24 of the guide tube 20 in a positive-locking manner. A possible axial adjusting movement of the guide tube 20 in relation to the support tube 50 is thus also limited in a defined manner at the same time by the length of this guide groove 24.

It can also be recognized from FIG. 21 that the locking screw 26 with its guide pin 27 correspondingly engages the guide groove 13 of the gripping element 1, so that an axial adjusting movement of the gripping element 1 in relation to the guide tube 20 is made possible, on the one band, and, on the other hand, the gripping element 1 is held nonrotatably in the mounting section 29. FIG. 21 shows the non-pretensioned starting position of the extractor 85. The pulling spindle 40 has just been tightened by actuating its drive hexagon 44 to the extent that the gripping jaws 9 with their outer, conical jacket surfaces 10 just come into contact with the lower, inner edge of the conical section of the mounting section 29 of the central through hole 28.

As is apparent from FIG. 21, the entire device 85 with the clamping surfaces 11 is attached in this starting state to the center pin 86 until the gripping jaws 9 with their outwardly slightly protruding front surfaces come into contact with the bottom of a component 88, in which the center pin 86 is pressed into a corresponding hole 93. It can be recognized that the gripping jaws 9 protrude axially at least minimally over both the guide tube 20 and the support tube 50 in this starting state of the extractor 85 in this exemplary embodiment. To fix the extractor at least slightly in this attached position, the pulling spindle 40 can be first pretensioned slightly manually with the fingers, so that the gripping jaws 9 are held clampingly at the center pin 86 under a slight radial pretension.

To extract the center pin 86, the pulling spindle 40 is now tightened in its drive hexagon 44 by means of a suitable wrench, so that the gripping element 1 perform a corresponding adjusting movement in the direction of arrow 89. Due to their conical jacket surface, the gripping jaws 9 with their clamping surfaces 11 are pressed radially inwardly, so that an absolutely snug hold of the gripping element 1 at the straight pin 86 is brought about.

Figure 22:
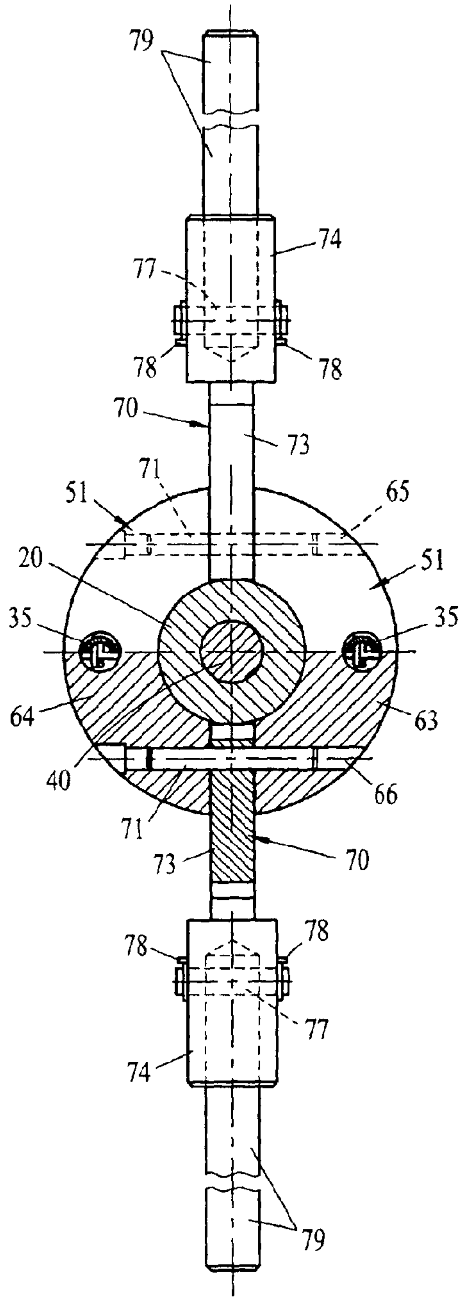
FIG. 22 is a partial section XXII—XXII through the extractor from FIG. 23.
Figure 23:
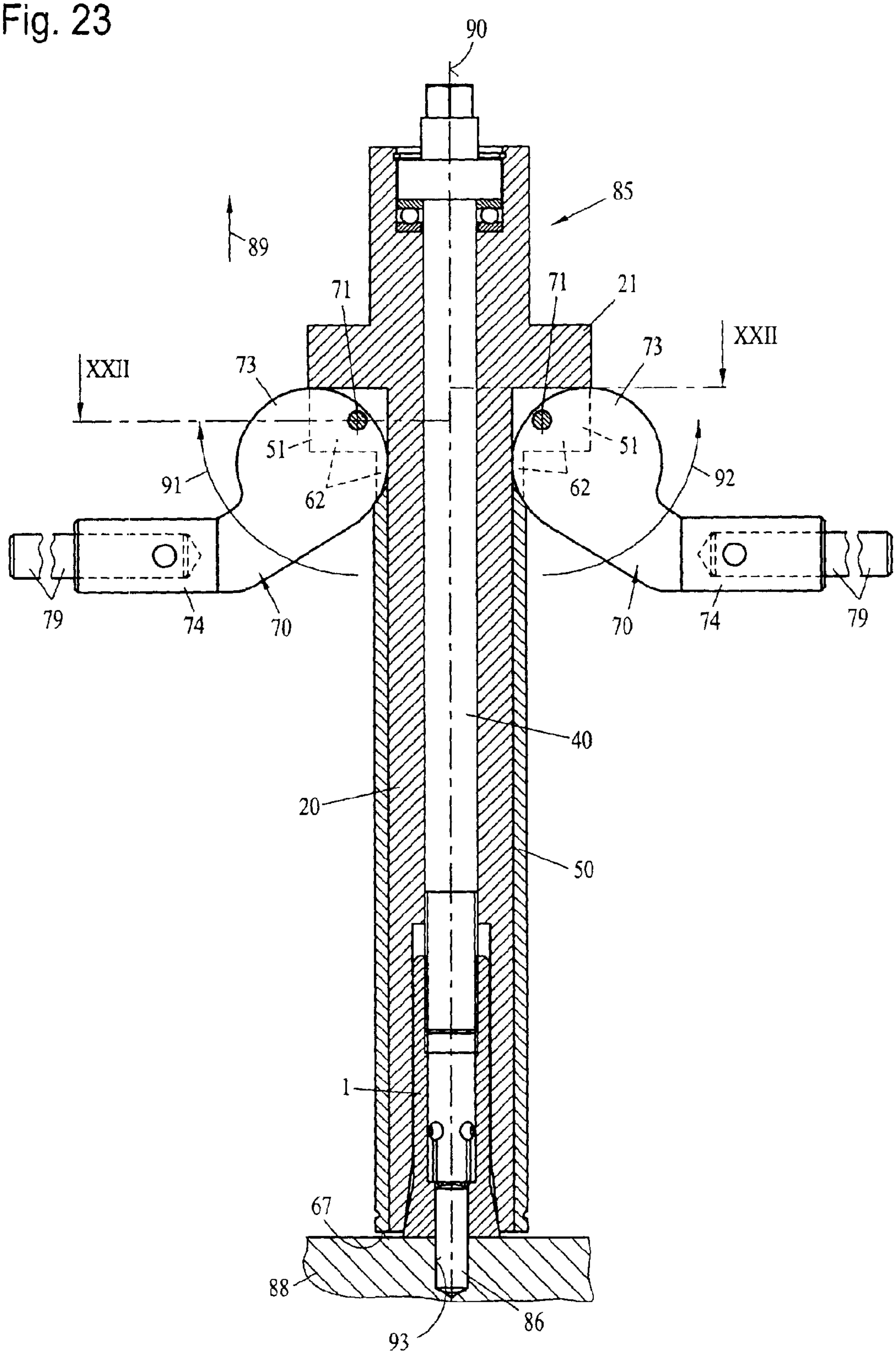
FIG. 23 is a section XXIII—XXIII through the extractor from FIG. 21.
Figure 24:
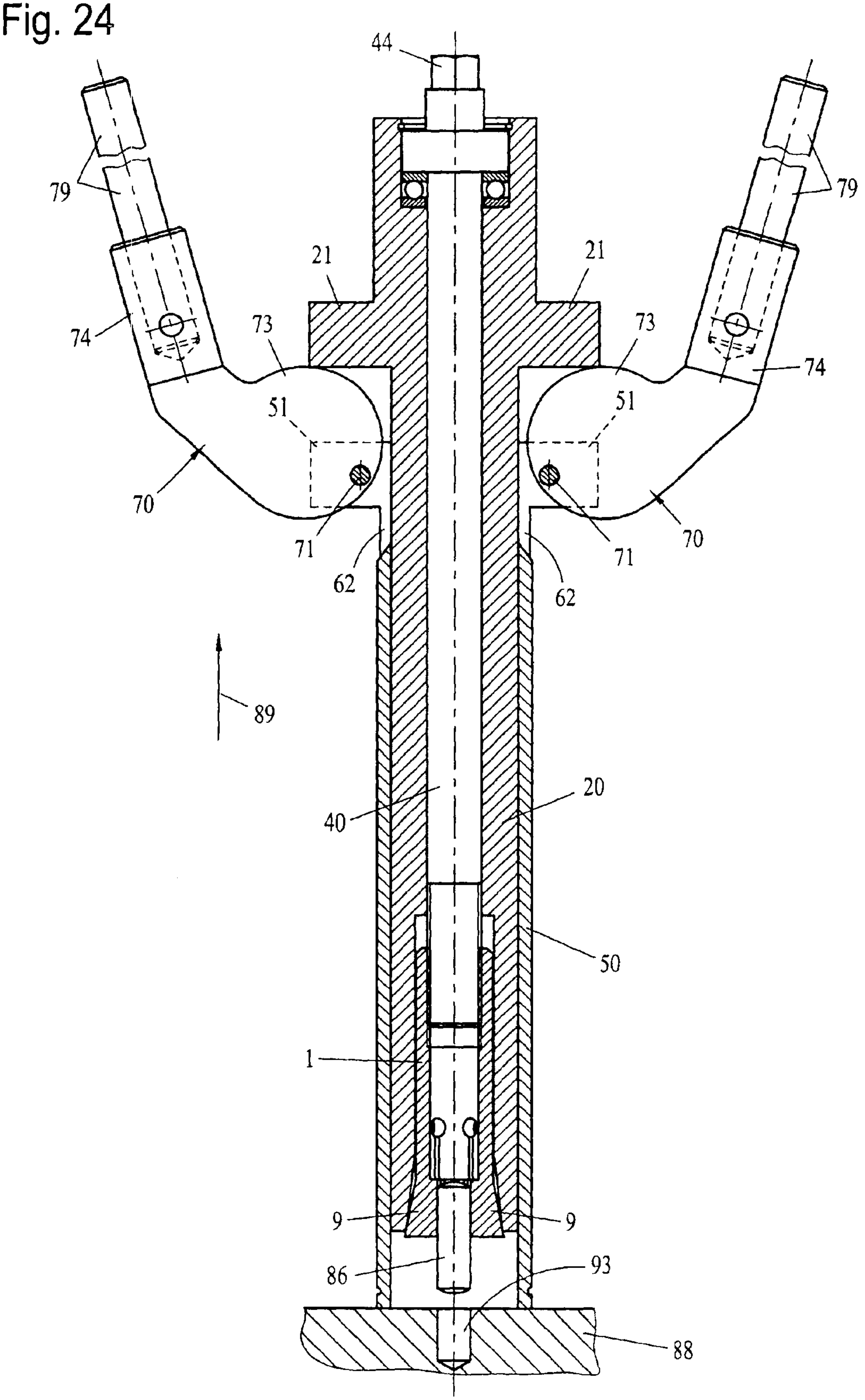
FIG. 24 is an extractor from FIGS. 21 through 23 after the extraction of the straight pin.

The two eccentric levers 70, whose partial section can be recognized in FIG. 22 and FIG. 23, respectively, are provided to make it possible now to exert a pulling action on the center pin 86. A pivot pin 71 each, on which a cam plate 73 each of the respective eccentric lever 70 is mounted pivotably, is inserted into the two cross holes 65 and 66. A handle 79 each is inserted into the two bearing blocks 74 and held by a mounting pin 77 each, which are in turn secured by two lock washers 78 each in this position. The view according to FIG. 22 shows a XXII—XXII from FIG. 23.

This FIG. 23 also shows the starting pivoted position of the two eccentric levers 70. In heir starting position, the two bearing blocks 74 extend, together with the inserted handles 79, essentially at right angles to the overall central longitudinal axis 90 of the extractor 85. In this starting position the eccentric levers 70 with their cam plates 73 are in contact with the underside of the support flange 21 of the guide tube 20. The pivoted position is limited in the downward direction by a corresponding continuation of the two slots 62 in the support tube 50 proper, so that this starting position is fixed in a defined manner.

To extract the center pin 86 from the component 88, the two eccentric levers 70 are pivoted in the direction of the two arrows 91 and 92 by actuating the said eccentric levers by their handles 79. Due to the eccentric action of the two cam plates 73, the guide tube 20 is displaced vertically upwardly in the direction of arrow 89 in relation to the support tube 50 during this pivoting movement. At the beginning of the pivoting movement of the pivoting levers 70, the support tube 50 also performs an adjusting movement opposite the arrow 89 vertically downward until it comes to lie flat on the component 88 with its annular front surfaces 67. Together with the pulling spindle 50 and consequently together with the gripping element 1, which engages the pulling spindle 40, the guide tube 20 is adjusted more, vertically in the direction of arrow 89, by the further pivoting of the eccentric levers 70 in the direction of the respective arrows 91 and 92, so that the center pin 86, seated snugly in the gripping jaws 9 of the gripping element 1, is extracted from the component 88.

It is thus illustrated based on the mode of operation shown in FIGS. 21 through 24 that pressed-in pins or other similar components can be extracted from their press fit by means of the device according to the present invention reliably and without greater effort on the part of the operator.

Figures 25, 26, 27:
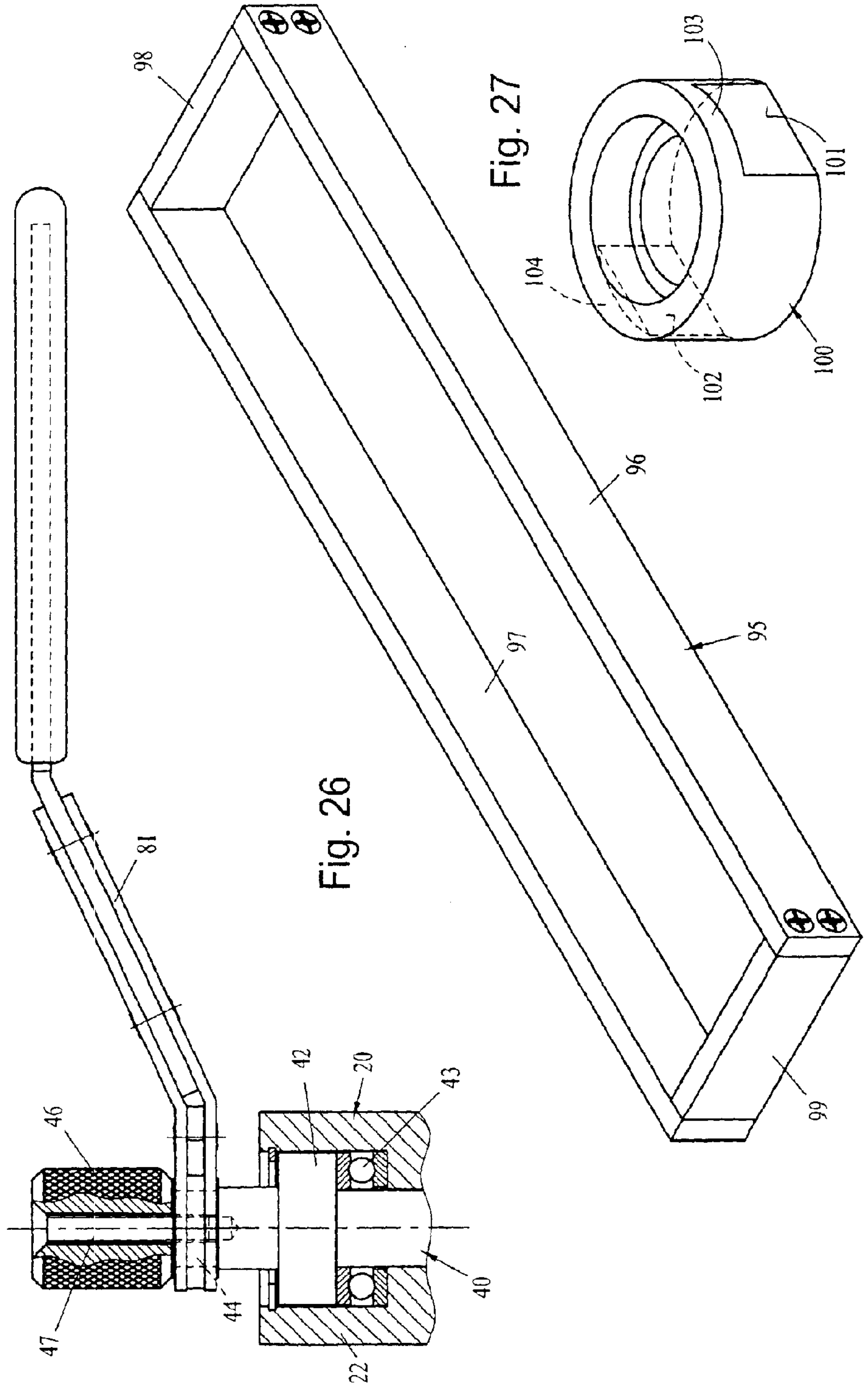
FIG. 25 is an enlarged partial section of the head part of the extractor from FIGS. 21 through 24 with the knurled head mounted and with the ratchet from FIGS. 19 and 20 attached.
FIG. 26 is a support frame.
FIG. 27 is a support ring, which can be brought into engagement with the support frame from FIG. 26 in a positive-locking and longitudinally displaceable manner.

To additionally simplify the handling of the device according to the present invention, the ratchet 81 according to FIGS. 19 and 20 as well as the knurled head 46 according to FIG. 12 are provided, which are shown in FIG. 25 in their mounted state on the extractor 85.

As is apparent from FIG. 25, the ratchet 81 is first attached to the drive hexagon 44 of the pulling spindle 40, and the knurled head 46, which has a larger diameter, is subsequently fastened to the pulling spindle 40 on the front side by means of the mounting screw 47. The ratchet 81 is thus held captively on the drive hexagon 44.

The knurled head 46 is used for the manual actuation, e.g., when the extractor 85 is attached to the center pin 86 until a slight pretension or clamping holding of the center pin 86 by the gripping jaws 9 is achieved. To attain sufficiently strong clamping forces, the pulling spindle 40 is tightened more via the ratchet 81, so that the gripping element 1 is pulled farther into the guide tube 20 or into the mounting section 29 of the guide tube 20. Extremely strong clamping forces can thus be reached, so that the extractor 85 "can be anchored" on the center pin in a fully snug manner via its gripping element 1. The ratchet 81 can be reversed for drive to the right and drive to the left, so that the clamping connection can also be released in a simple manner.

Additional elements may also be provided for the extractor 85 for variable use.

Thus, FIG. 26 shows a support frame 95, which comprises four individual frame elements 96, 97, 98 and 99 in this exemplary embodiment, which may, e.g., be screwed to one another. For example, the support ring 100 from FIG. 27 is provided for using an extractor with this support frame 95. This support ring is provided with two diametrically opposed, radially set-back guide surfaces 101 and 102, with which the support ring 100 can be inserted fittingly between the two longitudinally extending frame elements 96 and 97 of the support frame 95. These two guide surfaces 101 and 102 are limited on one side in the axial direction by a support flange 103 and 104 each. The support ring 100 is supported with these two support flanges 103, 104 at the two frame elements 96 and 97 of the support frame 95 during the operation.

Figure 28:
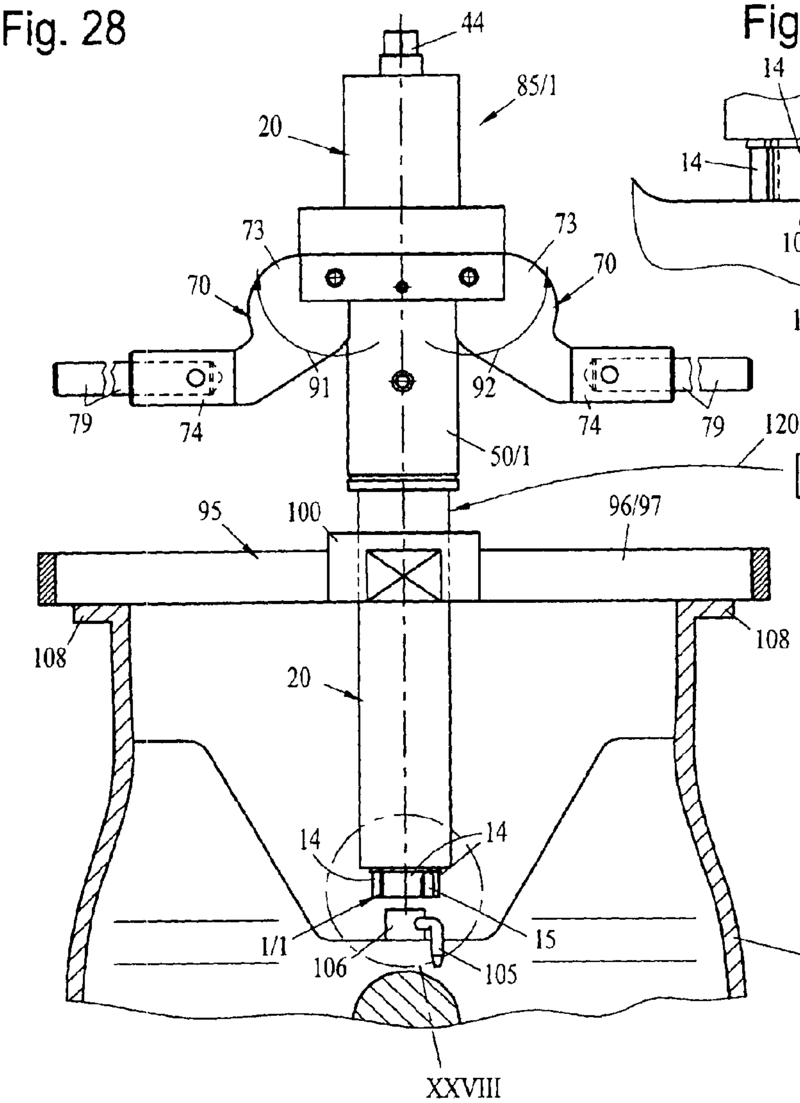
FIG. 28 is a second embodiment of a extractor in use with the support frame from FIG. 26 as well as with the support ring from FIG. 27.

Such a use of the support frame 95 together with the support ring 100 is shown as an example in FIG. 28, and a second embodiment 85/1 of an extractor is used here as well. It can be recognized from FIG. 28 that the support tube 50/1 [of this—Tr.Ed.] extractor 85/1 is designed such that its axial length is considerably shorter than that of the guide tube 20. Instead of the gripping element 1, the gripping element 1/1 from FIGS. 5 through 8, which completely protrudes axially over the guide tube 20 with its extension sections 14, is used in the exemplary embodiment according to FIG. 28.

Furthermore, FIG. 28 also shows the enlarged recess 15, which is provided between two of these extension sections 14 and which can be pushed fittingly over a nozzle tube 105 of an injection nozzle 106 of an engine housing 107, as is shown in FIG. 28, for example, 5 during the extraction operation. In FIG. 28, the support frame 95 is attached to the web surface 108 of the engine housing 107. Furthermore, the support ring 100 is located between the two frame elements 96 and 97 of the support frame 95. The extractor 85/1 is pushed fittingly through the support ring 100 with its guide tube 20, so that after the axial end position has been reached, the gripping element 1/1 is attached to the injection nozzle 106 of the engine housing 107 with its extension sections 14, as can be recognized especially from FIG. 28*a*.

The subsequent pull-off or extraction of the injection nozzle 106 is performed in turn as was described in connection with the exemplary embodiment of the extractor 85.

The shorter support tube 50/1 is not supported on the front side on the bottom, but on the support ring 100, which is in turn supported via the support frame 95 on the engine housing 107. During the actuation of the eccentric levers 70 of the extractor 85/1 in the direction of the arrows 91 and 92, the guide tube 20 with its gripping element 1/1 is again retracted in relation to the support tube 50/1, as a result of which the injection nozzle 106 seated snugly in the gripping element 1/1 is extracted from its press fit at the same time.

To adapt the length of the guide tube 20 protruding over the support frame 95 in the downward direction, an intermediate ring 100/1 may be provided, which can be inserted between the support ring 100 and the support tube 50/1, as is indicated by the arrow 120 in FIG. 28. A plurality of intermediate rings 100/1 of equal or different length may be provided here for adapting the length.

Figure 28A:
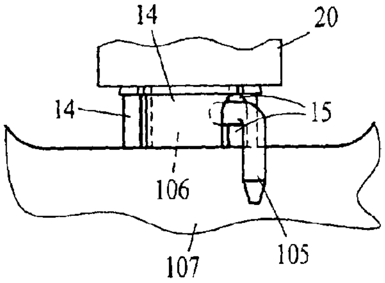
FIG. 28*a* is an enlarged detail XXVIII from FIG. 28 with the extractor lowered.

It can be clearly recognized from FIG. 28*a* that the nozzle tube 105 passes radially to the outside through the recess 15 of the gripping element 1/1 or its extension section 14.

Figure 29:
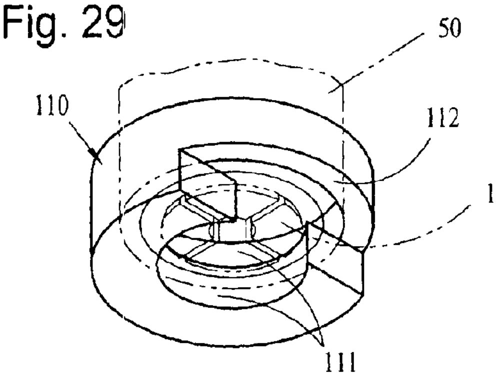
FIG. 29 is a perspective bottom view of a first adapter ring.
Figure 30:
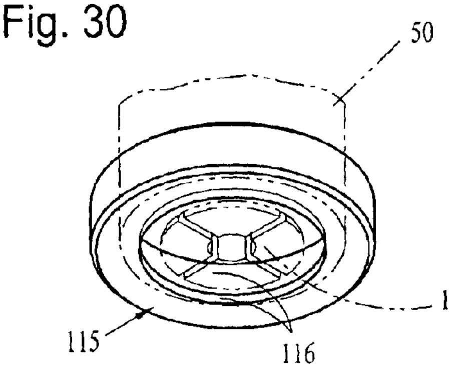
FIG. 30 is a perspective bottom view of a plastic ring that can be placed on the support tube from FIG. 13.

FIGS. 29 and 30 show as examples additional adapter elements, which can be attached, e.g., to the front side of the support tube 50 of the extractor 85.

FIG. 29 shows an adapter ring 110, which has a stepped, central opening 111 as well as an axially set-back recess 112. Such an adapter ring 110 is to be provided, e.g., in the case of different surfaces at which the support tube 50 shall be supported during the extraction operation. Other shapes of the adapter ring may also be provided, which depend essentially on the field of use of the extractor and are not shown explicitly in the drawings because of the many different possibilities of design.

Furthermore, a plastic ring 115, which likewise has a central, stepped opening 116, may also be provided according to FIG. 30. Such a plastic ring, which can be attached to the support tube 50 on the underside, may be provided, e.g., to protect the area surrounding a straight pin to be extracted.

While specific embodiments of the invention have been shown and described in detail to illustrate the application of the principles of the invention, it will be understood that the invention may be embodied otherwise without departing from such principles.

What is claimed is:

1. An extractor for extracting a straight pin or another component with a cylinder section that is pressed into a hole and protrudes from the hole, the extractor comprising:

a cylindrical section with a gripping element having a tubular basic body;

a guide tube, said tubular basic body being non-rotatably and axially adjustable in said guide tube;

a set of gripping jaws provided at an outer end of said tubular basic body, said gripping jaws having a conical outer jacket surface and an inner circular perimeter, said gripping jaws attaching said gripping element to said straight pin or said cylindrical section of said component;

a pulling spindle for pulling said basic body axially into said guide tube, for pressing said gripping jaws radially inwardly by said conical jacket surfaces in cooperation with said guide tube, for a snug hold of said gripping jaws at said straight pin or said cylindrical section is brought about;

a mechanical adjusting drive operated separately from said pulling spindle; and a support tube that is arranged directly on said guide tube and is axially adjustable in relation to said guide tube by means of said mechanical adjusting drive in an axial adjustment, said support tube being supported axially in an area surrounding said straight pin during said axial adjustment.

2. An extractor in accordance with claim 1, wherein said mechanical adjusting drive is formed by at least one eccentric lever provided with a cam plate actuated manually and mounted pivotably for a pivoting movement at said support tube wherein said cam plate is supported axially at a radially protruding support flange of said guide tube during said pivoting movement of said eccentric lever.

3. An extractor in accordance with claim 1, wherein for direct support at said component in an area surrounding said straight pin, a length of said support tube is adapted to a length of said guide tube such that said support tube ends approximately flush with said guide tube in its axial starting position with said adjusting drive not actuated.

4. An extractor in accordance with claim 1, further comprising an annular adapter pushed axially over said support tube and provided for an indirect support of said support tube in an area surrounding the straight pin.

5. An extractor in accordance with claim 1, wherein a length of said support tube is considerably shorter than a length of said guide tube and a support frame is provided as an adapter together with a support ring through which said guide tube passes axially to said straight pin or another component to be extracted during use, and said extractor is supported axially via said support ring and said support frame.

6. An extractor in accordance with claim 5, wherein one said support ring or more intermediate rings of equal or different axial length is/are provided, via which a length of said guide tube that passes through said support ring can be set to different values.

7. An extractor in accordance with claim 2, wherein said support tube comprises an end with a bearing flange located toward said guide tube, said eccentric lever or eccentric levers is/are mounted pivotably in said bearing flange, and one or more tension springs, by which said guide tube is reset into a starting position during a release of said eccentric levers in said support tube, is/are provided between said support flange of said guide tube and said bearing flange of said support tube.

8. An extractor in accordance with claim 1, wherein said pulling spindle is provided at one of a spindle end with an external thread and said pulling spindle engages an internal thread of said basic body with said external thread for said axial adjustment of said basic body in said guide tube and said threaded pulling spindle is mounted axially snugly and rotatably in said guide tube in a head part of said guide tube at a location axially opposite said basic body.

9. An extractor in accordance with claim 8, wherein said pulling spindle has a wrench profile protruding axially from said guide tube at another spindle end located opposite said gripping element and a knurled heed is fastenable in an axial extension to said wrench profile.

10. An extractor in accordance with claim 8, further comprising:

a ratchet which is reversed for rotation to the right and for rotation to the left and is captively secured on said wrench profile.

11. An extractor in accordance with claim 1, comprising a set of different gripping elements with a set of associated gripping jaws of different designs, which can be arranged interchangeably with one another in said guide tube, said different gripping jaws being provided with a set of radially inwardly directed clamping surfaces forming an approximately round hollow cylinder of different diameters interrupted in a circumferential direction in a non-tensioned starting position.

12. An extractor in accordance with claim 10, wherein said clamping surfaces of said associated gripping jaws have different surface structures and are optionally provided with a set of internal teeth or with a hard metal surface coating.

13. An extractor in accordance with claim 1, wherein said gripping jaws are provided with an axial extension section axially protruding over said guide tube by several mm, and a larger recess is provided in an area of at least one of a set of longitudinal slots separating said gripping jaws together with said extension sections.

14. An extractor comprising:

a cylindrical section with a tubular body having a sectional top and a sectional bottom along an axis, including an inner thread at said sectional top, said sectional bottom shaped to form an expanding outer conical jacket surface and including a plurality of inner gripping jaws at said sectional bottom to grab a straight pin protruding from a hole;

an inner pulling spindle with an elongated body having a spindle top and a spindle bottom along said axis with an outer thread at said spindle bottom for interlocking with said inner thread and a radially protruding support flange at a perimeter of said spindle top;

a guide tube with an inner elongated guide along said axis, said guide tube having a tubular top, a tubular bottom, a circular seating around an inner perimeter of said tubular top for fitting said inner pulling spindle at said tubular top with said circular seating preventing said protruding support flange from dropping further, a cylindrical spacing around another inner perimeter of said tubular bottom for fitting said cylindrical section and allowing said inner pulling spindle to axially pull said cylindrical section into said guide tube and glide said cylindrical section along said inner elongated tubular guide, an outer support flange around an outer surface of said guide tube and a first adjusting element adjacent said outer support flange;

a support tube with a tubular shape slidable along said outer surface along said axis, said support tube having a support tube top and a support tube bottom, an annular front surface at said support tube bottom and a second adjusting element at said support tube top, wherein at least one of said first adjusting element and said second adjusting element is a mounting cam means and the other adjusting means is a pushing support; and an eccentric lever pivotally mounted on said cam means and pushing against said pushing support to push said annular front surface against a perimeter around said hole as said plurality of inner gripping jaws grasps and pulls said straight pin away from said hole.

15. The extractor according to claim 14, wherein said plurality of inner gripping jaws are pressed radially inwardly by said conical jacket surfaces in cooperation with said guide tube, so that a snug hold of said gripping jaws at said straight pin or a circular section is brought about.

16. The extractor according to claim 14, wherein a length of said support tube is considerably shorter than a length of said guide tube and a support frame is provided as an adapter together with a support ring through which said guide tube passes axially to said straight pin or another component to be extracted during use, and said extractor is supported axially via said support ring and said support frame.

17. The extractor according to claim 16, wherein one said support ring of equal or different axial length is provided, via which a length of said guide tube that passes through said support ring can be set to different values.

18. The extractor according to claim 14, wherein said support tube comprises an end with a bearing flange located toward said guide tube, said eccentric lever is mounted pivotally in said bearing flange, and one or more tension springs, by which said guide tube is reset into a starting position during a release of said eccentric lever in said support tube, is provided between said support flange of said guide tube and said bearing flange of said support tube.

* * * * *